United States Patent
Maiwald

(10) Patent No.: US 9,742,328 B2
(45) Date of Patent: Aug. 22, 2017

(54) METHOD FOR CONTROLLING AN ELECTRIC MACHINE

(71) Applicant: AUDI AG, Ingolstadt (DE)

(72) Inventor: Stefan Maiwald, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/718,571

(22) Filed: May 21, 2015

(65) Prior Publication Data
US 2015/0340976 A1    Nov. 26, 2015

(30) Foreign Application Priority Data
May 22, 2014 (DE) .................. 10 2014 007 632

(51) Int. Cl.
*H02K 3/04*    (2006.01)
*H02P 6/28*    (2016.01)
*H02P 27/06*   (2006.01)

(52) U.S. Cl.
CPC ............ *H02P 6/28* (2016.02); *H02P 27/06* (2013.01); *H02P 2207/05* (2013.01)

(58) Field of Classification Search
CPC .......... H02K 29/00; H02K 29/08; H02K 9/28; H02P 6/06; H02P 6/02; H02P 6/16
USPC .................................. 318/538–540, 558
See application file for complete search history.

(56) References Cited

U.S. PATENT DOCUMENTS

| | | | |
|---|---|---|---|
| 3,242,404 A * | 3/1966 | Favre | H02K 29/12 310/168 |
| 4,668,898 A * | 5/1987 | Harms | H02K 11/33 310/227 |
| 4,763,053 A * | 8/1988 | Rabe | G11B 15/26 310/180 |
| 4,963,778 A | 10/1990 | Jensen et al. | |

(Continued)

FOREIGN PATENT DOCUMENTS

| DE | 36 42 724 A1 | 6/1988 |
|---|---|---|
| DE | 101 27 169 A1 | 5/2002 |

(Continued)

OTHER PUBLICATIONS

European Search Report with respect to counterpart European patent application EP 15 00 1474.

(Continued)

*Primary Examiner* — Bentsu Ro
(74) *Attorney, Agent, or Firm* — Henry M. Feiereisen LLC

(57) ABSTRACT

A method for controlling an operation of a multi-phase electric machine with a stator and a rotor is disclosed. The stator or the rotor includes permanent magnets, whereas the rotor or the stator includes a plurality of conductor bars interconnected by connecting elements of at least one circuit board and disposed within a magnetic field of the permanent magnets and having an internal inductance connected. The connecting elements are arranged outside the magnetic field and have an external inductance. Each phase includes at least one of the conductor bars. The multi-phase electric machine is controlled by regulating for each phase of the multi-phase electric machine at least one electrical quantity, which is dependent on the internal and external inductance of a respective phase, to a desired value.

18 Claims, 5 Drawing Sheets

(56) References Cited

U.S. PATENT DOCUMENTS

| | | | |
|---|---|---|---|
| 5,552,682 A * | 9/1996 | Ushikoshi | H02P 6/16 318/400.04 |
| 6,844,639 B2 | 1/2005 | Lacaze | |
| 7,262,568 B2 * | 8/2007 | Takada | H02P 6/10 318/400.3 |
| 2002/0060105 A1 | 5/2002 | Tominaga et al. | |

FOREIGN PATENT DOCUMENTS

| | | |
|---|---|---|
| DE | 103 04 039 A1 | 8/2004 |
| DE | 10 2005 032 964 A1 | 3/2007 |
| DE | 10 2007 033 145 | 1/2009 |
| DE | 10 2007 054 373 A1 | 5/2009 |
| DE | 10 2010 019 151 | 11/2011 |
| DE | 10 2010 024 344 A1 | 12/2011 |
| JP | 2010-088149 | 4/2010 |

OTHER PUBLICATIONS

Translation of European Search Report with respect to counterpart European patent application EP 15 00 1474.

* cited by examiner

METHOD FOR CONTROLLING AN ELECTRIC MACHINE

CROSS-REFERENCES TO RELATED APPLICATIONS

This application claims the priority of German Patent Application, Serial No. DE 10 2014 007 632.6, filed May 22, 2014, pursuant to 35 U.S.C. 119(a)-(d), the content of which is incorporated herein by reference in its entirety as if fully set forth herein.

BACKGROUND OF THE INVENTION

The present invention relates to a method for controlling an operation of an electric machine, a control system for controlling an operation of an electric machine and an electric machine.

The following discussion of related art is provided to assist the reader in understanding the advantages of the invention, and is not to be construed as an admission that this related art is prior art to this invention.

An electric machine can, in addition to a rotor and a stator, have as components for controlling phases a control gear, which can be configured as an external switching regulator, a rectifier, an inverter and/or a converter, which may in turn include as electronic components metal-oxide-semiconductor field-effect-transistors (MOSFETs) or bridges with bipolar transistors having insulated gate electrodes (IGBT). A pulse-width-modulated (PWM) clock of such an electric machine may have a frequency of about 1 kHz to about 20 kHz. The external switching regulator may be operated at a frequency of about 100 kHz to about 1 MHz.

It would therefore be desirable and advantageous to obviate prior art shortcomings and to provide an improved method, a control system and an electric machine.

SUMMARY OF THE INVENTION

According to one aspect of the present invention, in a method for controlling an operation of a multi-phase electric machine with a stator and a rotor as components, wherein the stator or the rotor comprises permanent magnets, wherein the rotor or the stator comprises a plurality of conductor bars interconnected by connecting elements of at least one circuit board and disposed within a magnetic field of the permanent magnets and having an internal inductance connected, wherein the connecting elements are arranged outside the magnetic field and have an external inductance, wherein each phase includes at least one of the conductor bars, the electric machine is controlled by regulating for each phase of the multi-phase electric machine at least one electrical quantity, which is dependent on the internal and external inductance of a respective phase, to a desired value.

According to an advantageous feature of the present invention, the at least one electrical quantity controlled to the intended desired value may be a voltage and/or a current measured for the respective phase.

According to another advantageous feature of the present invention, an actual instantaneous value of the at least one electrical quantity, i.e. of the voltage and/or the current, of a respective phase may be tapped during operation of the electric machine at a tap disposed between the conductor rods and the connecting elements of the respective phase.

According to another advantageous feature of the present invention, the desired value of the at least one electrical quantity may be calculated and/or adjusted in dependence of at least one mechanical operating parameters of the electric machine by using an algorithm that is used for the feedforward control of the electric machine. The at least one mechanical operating parameter to be taken into account may be a rotation speed of the electric machine and/or an angular position of the rotor relative to the stator.

The method can be carried out for an electric machine that is used as an electric motor and/or as a generator.

According to another aspect of the present invention, a control system is configured to control an operation of an electric machine having as components a stator and a rotor. A first of the two components includes several conductor bars, which are interconnected via connecting elements of at least one circuit board. A second of the two components includes permanent magnets. The conductor bars are arranged within a magnetic field of the permanent magnets and have an internal inductance. The connecting elements are arranged outside the magnetic field and have an external inductance. The electric machine has several phases, with each one of the phases encompassing at least one of the conductor bars. The control system is configured to control for each phase of the electric machine at least one electrical quantity that depends on the internal and external inductance of the respective phase to a desired value.

Advantageously, the control system for each phase may further include a switching regulator and a control unit which is connected upstream of the switching regulators of all phases. The control unit may be configured to perform an algorithm to be used for feedforward control of the electric machine and to provide the desired value of the at least one electric parameter for the respective phase.

According to another advantageous feature of the present invention, the control system may include for each phase at least one measurement module configured to measure an actual value of the at least one electrical quantity of the respective phase.

According to another advantageous feature of the present invention, the control system may include at least one inverter which is disposed between contacts connected to an external voltage source of the electric machine and the phases of the electric motor and is adapted to perform switching control for the electric machine. Furthermore, the control system may include an intermediate circuit capacitor which is arranged between the two contacts. Depending on the definition, the control system may include as further components the phases of the electric machine, wherein each phase has an internal voltage source and an internal resistance associated with the at least one conductor bar of the phase, the internal inductance arranged within a magnetic field of the electric machine, and an external inductance arranged outside the magnetic field of the electric machine. The control system is usually arranged in a housing of the electric machine.

According to another aspect of the present invention, an electric machine includes as components a stator or a rotor, wherein a first component, usually either the stator or the rotor, includes several conductor bars, which are interconnected via connecting elements of at least one circuit board. A second component, usually the rotor or the stator, includes permanent magnets. The conductor bars are arranged within a magnetic field of the permanent magnets and have an internal inductance. The connecting elements of the at least one printed circuit board are arranged outside the magnetic field and have an external inductance. The electric machine has a number of phases. In one embodiment, each phase has the same number of conductor bars, with each of the phases having at least one of the conductor bars. For controlling an operation of the electric machine, at least one electrical quantity which is dependent on the internal and external inductance of the respective phase for each phase of the electric machine must be controlled to a desired value.

The electric machine also includes an embodiment of the aforedescribed control system and is to be controlled by an embodiment of the method. The conductor bars of the first component of the electric machine may advantageously be arranged in a soft magnetic material.

In addition, each phase may include an internal power source, an internal resistance associated with the at least one conductor bar of the respective phase, the internal inductance arranged within a magnetic field of the electric machine, and the external inductance arranged outside the magnetic field of the electric machine.

The internal and external inductances of the respective phase are to be used for carrying out the switching control during operation of the control system and/or of the electric machine, whereas only the internal inductances of the conductor bars arranged inside the magnetic field are to be used for performing a function of the electric machine.

Furthermore, the first component of the electric machine may advantageously include iron packets to be produced from iron powder as a soft-magnetic material. These iron packets have grooves in which the conductor rods associated with the phases of the electric machine are arranged. Alternatively, iron laminations made of a soft magnetic material and associated with the conductor bars may be used for the first component. Eddy currents can be reduced and a switching frequency of the electric machine can be increased by using the conductor bars embedded in the iron powder.

The inverter of the electric machine is at least implicitly used for switching control, which is why the electric machine has for each phase an integrated switching regulator capable of achieving a high switching frequency in the order of 100 kHz to 1 MHz.

The control system of the electric machine, which has an inverter and the switching regulator, may be integrated in the housing of the electric machine, so that the control system is shielded with regard to electromagnetic compatibility (EMC). The control system may include as electronic switching elements metal-oxide-semiconductor field-effect transistors (MOSFETs) and an intermediate circuit capacitor, for example a ceramic chip capacitor arranged between contacts of the control system to an external voltage source.

Otherwise conventional coils or windings can thus advantageously be omitted when using the conductor bars for the electric machine. The conductor bars or conductive bars, which replace the windings, are interconnected via connecting elements of the circuit board that may be formed as conductor tracks and/or electronic components. Eddy currents can be minimized by embedding the conductor bars in iron powder as a soft-magnetic composite material (SMC, soft-magnetic composite).

The equivalent circuit of each phase of the electric machine includes a series circuit with an internal voltage source supplying a voltage with a value that is proportional to the value of the rotational speed of the electric machine, and the internal resistance whose value corresponds to a sum of the values of the resistances of the conductor bars, of the connecting elements, of the MOSFETs and of the equivalent resistance (ESR) of the intermediate circuit capacitor. Furthermore, such a series circuit includes the effective internal inductance of the conductor bars of the respective phase, which are arranged within the magnetic field that causes the Lorentz force of the electric machine. The series circuit further includes the external inductance of the connecting elements, for example conductor tracks, of the phase that are arranged on the at least one printed circuit board outside of the magnetic field. The entire inductance, i.e. the internal and the external inductances, is used in this case for a function of the switching controllers for performing the switching control, whereas only the effective internal inductance is used for the function of the electric machine. In general, the voltage supplied by the external power source must usually be divided by inverters designed as switching regulators and assigned each to a respective phase, wherein the external voltage source is distributed among the internal voltage sources.

The disclosed control system can perform, inter alia, a function of a switching regulator, with which the voltage of an intermediate circuit of a synchronous converter can be controlled to an actual desired instantaneous value of the voltage of each phase and thus reduced. Accordingly, the current flowing through the respective phase can be regulated to an actually desired value and thus reduced. The control can be performed using conventional switching control methods, pulse methods or so-called chopper methods. A number of the switching regulator hereby corresponds to a number of phases, wherein the switching regulators of the control system are separated from one another. In addition, each switching regulator may include an integrated circuit or a chip.

An actual value of a voltage and/or an actual value of a current can usually be measured for each phase by using the measurement modules, which are also separated from one another. Furthermore, an output stage and one respective module for controlling the voltage and current may be associated with each phase. In this case, an actual value of the current to be measured can be determined, for example, by way of calculation from one or two measured values of the current flowing through the respective phase. The algorithm to be performed by the control system may also be configured as a feed-forward algorithm. A function of the respective switching controller can be executed quickly, for controlling an AC voltage of a respective phase of the rotating electric machine.

The electric machine and thus the electric motor and/or generator may have a high switching frequency, so that a current flowing through the conductor bars is no longer constant and thus no longer has a superimposed square-wave pattern. The switching frequency thus does not cause any mechanical excitations. In one embodiment, a currently desired setpoint of the voltage and/or current on the conductor bars is calculated by considering, for example, a field-oriented control of the electric machine. The calculated desired points can be taken into account as default for regulating the voltage and/or the current of the respective phase.

Optionally, a tap at a physical tapping point disposed between the current and/or voltage between a conductor bar and hence an internal inductance and between a connecting element of the respective circuit board and hence an external inductance can be used. Accordingly, a function for switching control of the electric machine can be separated in the circuitry from an actual function of the electric machine.

Thus, the inverter and the switching regulator designed, for example, as a step-down switching regulator are combined in the control system of the electric machine, wherein the control system is integrated into the housing of the electric machine. One of the two components of the electric machine, which is designed as a stator or a rotor, has iron packets which are formed from iron powder as a soft magnetic composite material. The conductor bars that replace an otherwise conventional coil of an electric machine favor the intended switching control because a number of otherwise conventional windings of the coils can be reduced by using the conductor bars. It is not necessary to design conductor tracks as connecting elements of the circuit boards commensurate with aspects of switching controls. The conductor bars can also be arranged in iron laminations or transformer sheets to provide a soft magnetic material. The conductor bars are arranged in grooves of the iron packets. The intermediate circuit capacitor disposed between contacts or terminals of the control system to the external voltage source forms hereby a small intermediate circuit. The electric machine can typically be operated in the range of an operating voltage of e.g. 6 volts to 17 volts without sacrificing performance. The rotational speed of the electric machine can be increased by increasing the internal voltage of the electric machine.

The electric machine can achieve a high switching frequency or clock frequency when carrying out the aforedescribed method. Otherwise conventional wires made of copper and coated with varnish can be eliminated by using the conductor bars. The conductor bars may be made of any electrically conductive material, typically a metal such as iron, aluminum or copper. In addition, the conductor bars have larger diameters than the conventional wires. In each case, a conductor bar is constructed to be either rigid or flexible depending on its thickness and has a polygonal or round cross-sectional shape. Parallel windings and delta connections can be realized by employing the conductor bars.

In one embodiment, a voltage for supplying this electric machine is increased for increasing an output power of an electric machine, if the machine is operated as an electric motor. An intermediate circuit capacitor of the control system can be implemented as ceramic chip capacitor or a film capacitor, thereby achieving steep flanks with minimal slope moderation in the voltage profile of each phase. In addition, the internal and external inductances of the phases are now used not only for generating a torque of an electric machine described as an electric motor, but are now also used for controlling the operation of electric machine. Thus, both the conductor bars arranged within the soft magnetic material and the connecting elements on the at least one circuit board provided for connecting the conductor bars are used at high clock or switching frequencies for performing a switching regulator function. An internal resistance of the phases of the first component is reduced through use of the conductor bars which have a greater diameter than otherwise used conventional wires.

The otherwise conventional windings of coils are replaced by the connecting elements on the at least one circuit board that can be produced with thick-film technology. The external inductance of the connecting elements of the at least one phase can also be designed as a so-called planar inductance coil. By using an, for example; ceramic chip capacitor for the small intermediate circuit capacitor, excellent high-frequency characteristics and a low series resistance in comparison with an otherwise conventional electrolytic capacitor with a high capacitance can also be attained. All components of the electric machine and of the control system are typically arranged in a housing of the electric machine and thus shielded from the outside. Furthermore, the electric machine when implemented, for example, as an electric motor, can be operated at a low intermediate circuit voltage. Moreover, the conductor rods are able to conduct high currents compared to otherwise conventional wires. Consequently, the full power of the electric machine can be used across a wide voltage range, in which the electric machine is operated.

The DC link voltage can be adjusted by controlling the voltage. However, the attainable high currents flow only within the electric machine, but not outside the electric machine. Furthermore, the electric machine can be operated quietly. Moreover, an increased pulse-width-modulated frequency can be achieved by controlled operation of the electric machine according to the method. Usually, high current peaks occur in electric machines, which are designed and/or operated as small, high performance motors, with pulse-width-modulation, which are to be buffered with the provided intermediate circuit capacitor of the electric machine. The capacity of this intermediate circuit capacitor is hereby inversely proportional to this frequency. A ceramic capacitor instead of an electrolytic capacitor is used for the intermediate circuit capacitor. Furthermore, a voltage applied to conductor rods can be reduced without the need to increase the size

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
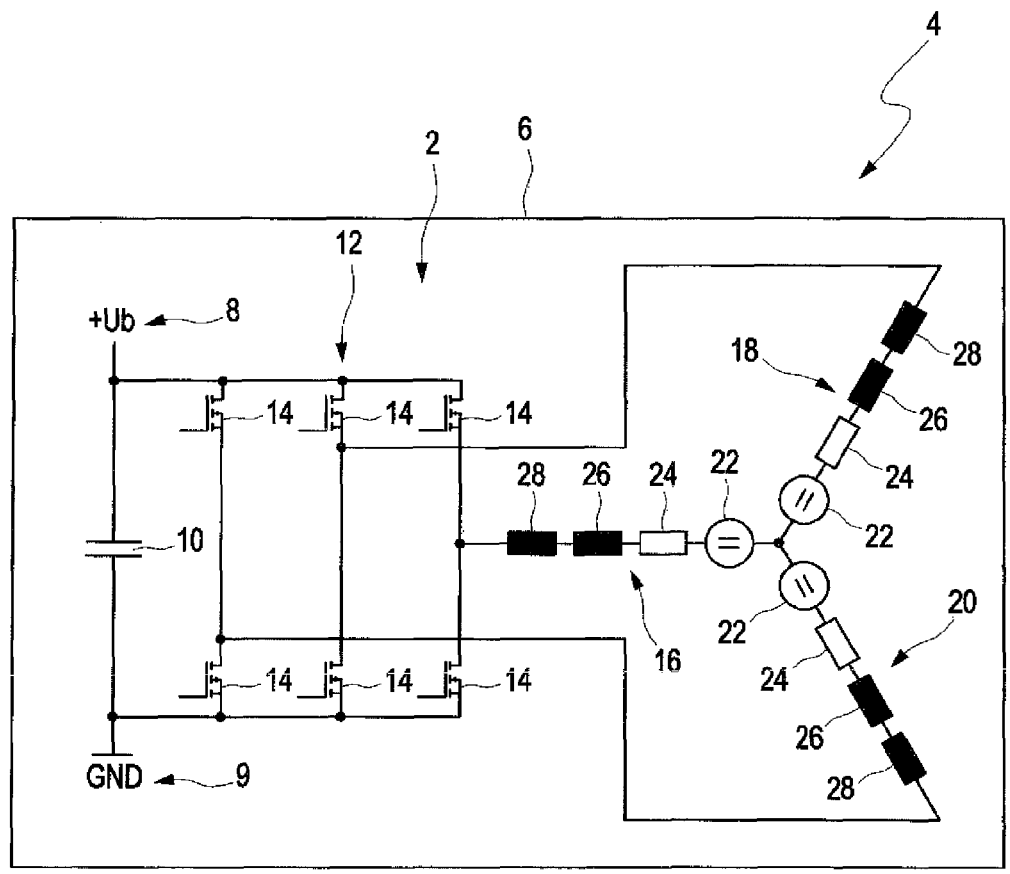
FIG. 1 shows a schematic diagram a first embodiment of a control system according to the present invention and a first embodiment of an electric machine according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a first embodiment of the control system 2 according to the invention of the first embodiment of the inventive electric machine 4 which is here entirely arranged in a housing 6 of the electric machine 4.

The control system 2 and hence the electric machine 4 are connected by way of contacts 8, 9 to an unillustrated external voltage source which supplies a DC voltage Ub. A DC link capacitor 10 as a component of the control system 2 is arranged here between the contact 8 representing the positive pole (+Ub) and the contact 9 representing ground potential. Furthermore, the two contacts 8, 9 are connected to an inverter 12 of the control system 2 designed as a half-bridge. This inverter 12 includes here six metal-oxide semiconductor field-effect transistors (MOSFETs) representing electronic switching elements 14. In the illustrated embodiment of the control system 2 and thus of the electric machine 4, the inverter 12 is integrated in the housing 6 of the electric machine 4 and is, at the same time, designed as a switching regulator of the electric machine 4, in this case as a step-down voltage regulator.

The electronic switching elements 14 of the inverter 12 are here connected to three phases 16, 18, 20 of the electric machine 4, wherein each phase 16, 18, 20 is shown schematically in FIG. 1 by its equivalent circuit diagram: Each phase 16, 18, 20 includes here an internal voltage source 22, wherein a value of a voltage of each of these voltage sources 22 is proportional to a value of a rotational speed of the electric machine 4. The rotational speed results from a frequency with which a rotor of the electric machine 4 rotates relative to a stator of the electric machine 4, which are not shown in FIG. 1. Each phase 16, 18, 20 has also an internal resistance 24 that corresponds to a resistance of conductor bars, which form here the phase windings 16, 18, 20 of the stator as the first component of the electric machine 2. The conductor bars are arranged in grooves of iron packets of the first component of the electric machine 4, wherein the first component is embodied here as a stator of the electric machine 4, wherein the iron packets are to be manufactured from iron powder. Alternatively, i.e. according to another embodiment, the first component could also be designed as the rotor of the electric machine 4. Furthermore, each phase 16, 18, 20 includes an internal inductance 26 that corresponds to the inductance of the conductor bars arranged within a magnetic field of the electric machine 4, and an external inductance 28 arranged outside the magnetic field and corresponding to the inductances of the connecting elements of the at least one circuit board.

Figure 2:
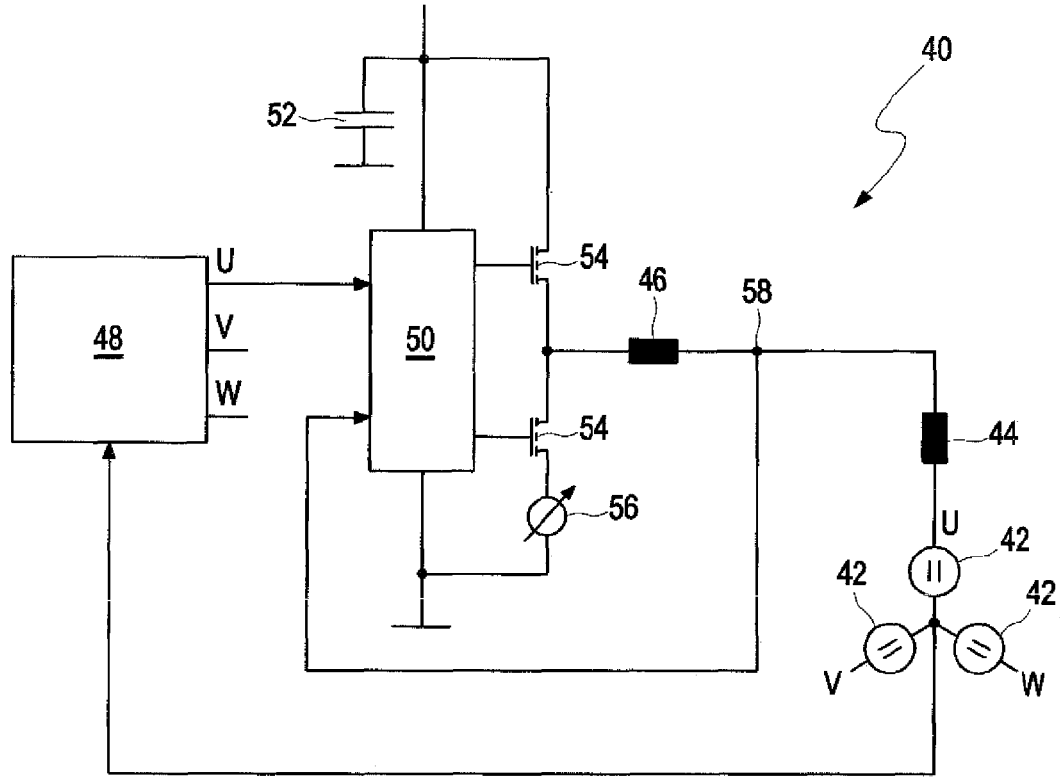
FIG. 2 shows a schematic diagram of a second embodiment of a control system according to the present invention.

FIG. 2 shows details of the second embodiment of the control system 40, which is designed to control a second embodiment of an electric machine. The electric machine includes here three phases, wherein an internal voltage source 42 of each phase is shown here. This produces during operation of the electric machine a first voltage U for a first phase, a second voltage V for a second phase, and a third voltage W for a third phase. In addition, FIG. 2 shows an internal inductance 44 resulting at least for one conductor bar of a phase. An external inductance 46 of each respective phase of the electric machine is produced by connecting elements disposed on at least one circuit board of the electric machine, wherein the conductor bars are electrically interconnected by these electrical connecting elements.

FIG. 2 shows as components of the control system 40 a control unit 48 and one of a total of three switching regulators 50, wherein one respective switching regulator 50 is associated with a respective one of the phases. Furthermore, a DC link capacitor 52, two electronic switching elements 54 as well as a measuring module 56 are associated with each one of the three switching regulators 50, wherein the measuring module 56 is here configured to measure a current flowing through at least one conductor bar of a respective phase. FIG. 2 also shows a tap 58 at which a voltage between the internal inductance 44 and the external inductance 46 of the respective phase can be tapped. An actual value of the voltage measured at this tap 58 is transmitted from the tap 58 to the respective switching regulator 50.

Furthermore, an actual angle of a rotor of the electric machine relative to a stator of the electric machine and an actual rotational speed of the electric machine are determined as mechanical operating parameters of the electric machine and transmitted to the control unit 48 starting from a node between the voltage sources 42. Desired values for the voltages U, V, W of the three phases of the electric machine can be determined with the control unit 48 and transmitted to a respective switching regulator 50 by taking into account the actual values of the mechanical operating parameters and of the inductances 44, 46 as well as by using an algorithm.

The switching regulator 50 explicitly shown in FIG. 2 is here associated with the first phase, for the voltage U of which the determined desired value is to be adjusted. Likewise, a desired value of a voltage V for the second phase is to be transmitted by the control unit 48 to a switching regulator 50 associated with the second phase, and a desired value of a voltage W for a third phase is to be transmitted by the control unit 48 to a third switching regulator 50 associated with the third phase.

Figure 3:
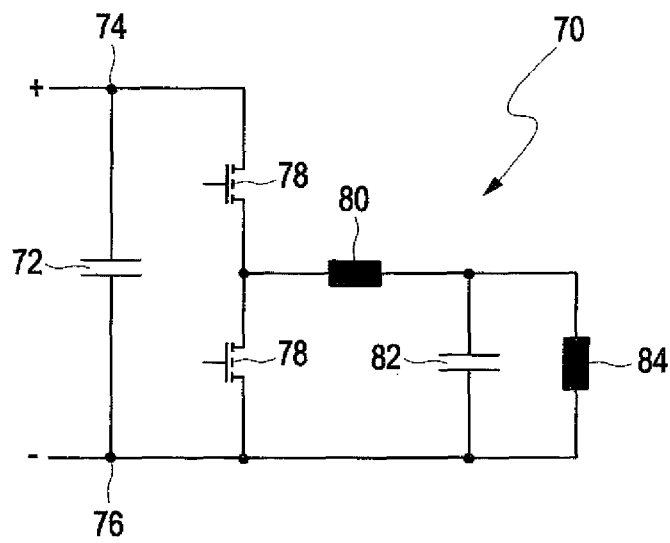
FIG. 3 shows a schematic diagram of a detail of a third embodiment of a control system according to the present invention.

The detail of third embodiment of the control system 70 illustrated in FIG. 3 includes here an intermediate circuit capacitor 72, which is arranged here between a contact 74 formed as positive pole and a contact 76 formed as a negative pole of an external voltage source. Furthermore, electronic switching elements 78, which are each connected downstream of a phase of a plurality of phases of an electric machine to be controlled by the control system 70, are connected downstream of the intermediate circuit capacitor 72 and the two contacts 74, 76. In addition, FIG. 3 shows an external inductance 80 of the electric machine and an internal capacitance 82 and an internal resistance 84 of the respective phase of the electric machine. Each phase of the electric machine includes here conductor bars which are interconnected by way of at least one circuit board, in the present example connecting elements arranged on the circuit board. The illustrated external inductance 80 corresponds to the inductance of the connecting elements of the at least one board. The internal capacitance 82 and the internal resistance 84 correspond to the capacitance and the resistance of the conductor bars of the respective phase. The components shown in FIG. 3 are here also designed as components of a synchronous converter of the control system 70.

Figure 4:
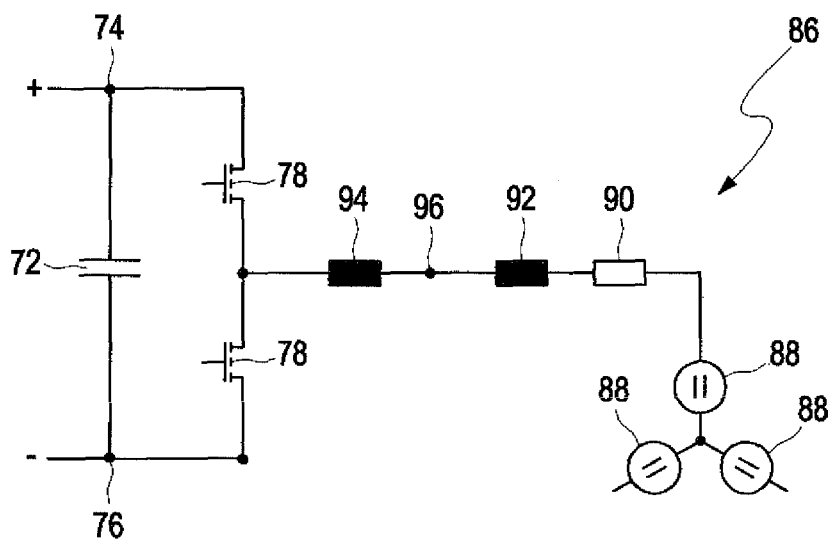
FIG. 4 shows a schematic diagram of a detail of a fourth embodiment of a control system according to the present invention.

The detail of the fourth embodiment of the control system 86 schematically illustrated in FIG. 4 also includes an intermediate circuit capacitor 72 and electronic switching elements 78 connected upstream by a respective phase of an electric machine to be controlled by this control system 86. The electric machine includes here also several, namely three phases. Each phase includes conductor bars which are connected upstream of at least one circuit board of the electric machine by way of connecting elements. In detail, FIG. 4 also shows three voltage sources 88, with one of these voltage sources 88 being assigned to a respective phase. FIG. 4 also shows an internal resistance 90 of the conductor bars of the respective phase, and an internal inductance of the conductor bars 92 of this phase. FIG. 4 also shows an external inductance 94 of the connecting elements of the at least one circuit board of the respective phase. A tap 96 is arranged between the internal inductance 92 and the external inductance 94, wherein an actual value of a current flowing through the respective phase and/or an actual value of a voltage of the respective phase can be tapped.

Figure 5:
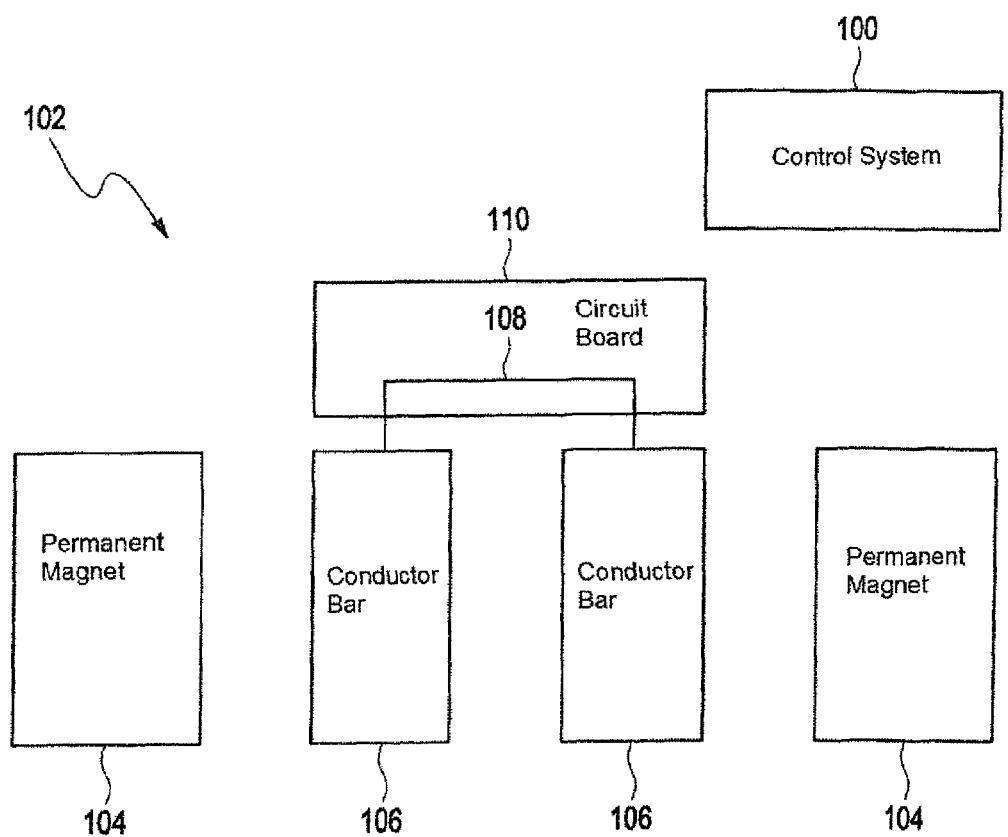
FIG. 5 shows a schematic diagram of a fifth embodiment of a control system according to the present invention and a detail of a second embodiment of an electric machine according to the present invention.

FIG. 5 shows a control system 100 according of an electric machine 102 comprising a stator and a rotor, wherein the stator comprises permanent magnets 104 and the rotor comprises at least two conductor bars 106 interconnected by a connecting element 108 of a circuit board 110 and disposed within a magnetic field of the permanent magnets 104 and having an internal inductance connected, wherein the connecting element 108 is arranged outside the magnetic field and has an external inductance, wherein each phase of the electric machine 102 includes at least one of the conductor bars 106.

The control system 100 is configured to regulate for each phase of the electric machine 102 at least one electrical quantity which is dependent on the internal and external inductance of the respective phase, to a desired value determined in dependence on at least one mechanical operating parameter of the electric machine 102 to provide the desired value of the at least one electrical quantity for each phase.

Figure 6:
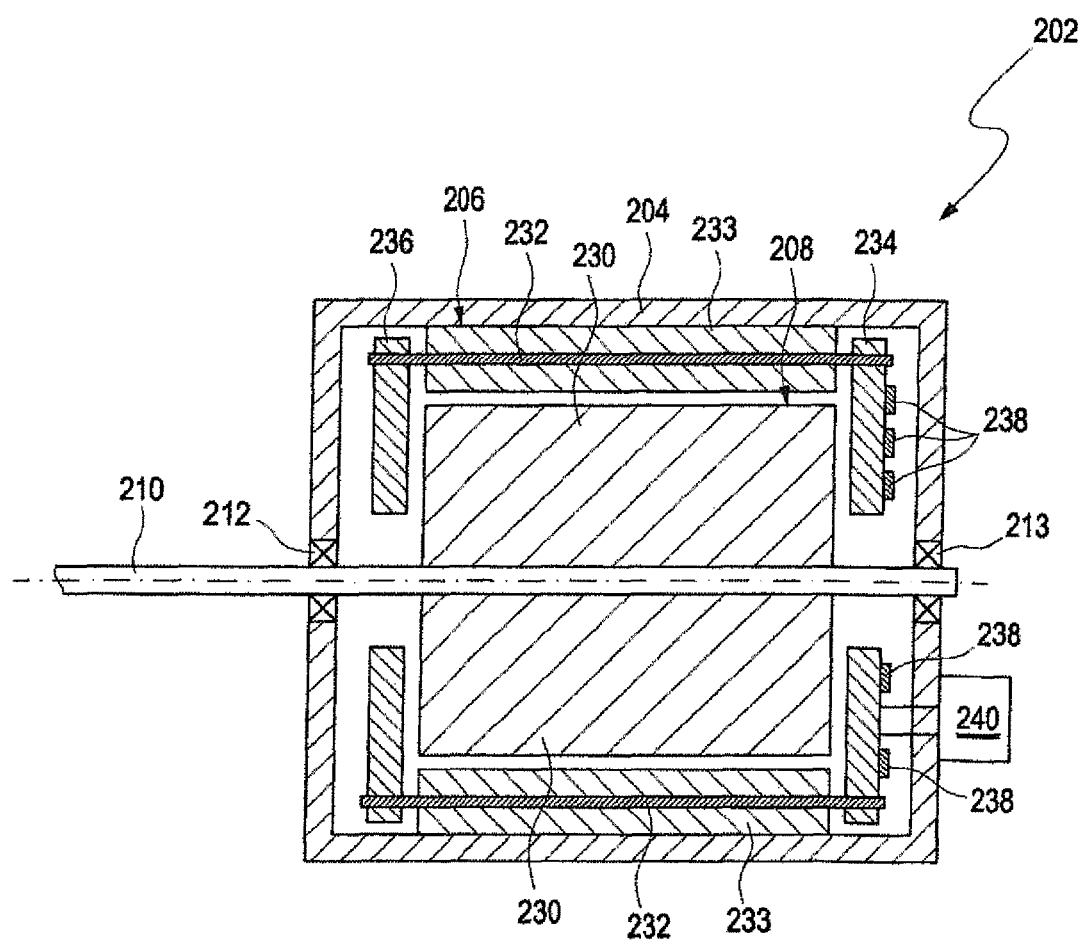
FIG. 6 shows a schematic diagram of a sixth embodiment of a control system according to the present invention and a detail of a third embodiment of an electric machine according to the present invention.

FIG. 6 shows an electric machine 202 comprising a housing 204, wherein a stator 206 and a rotor 208 are arranged coaxially to a shaft 210, wherein the pivotable rotor 208 is enclosed by the stator 206.

The shaft 210 is pivoted relative to the housing 204 above two bearings 212, 213 which are arranged at the front side and at the back side of the housing 204.

In the described embodiment, the rotor 208 shows a number of permanent magnets 230 connected to the shaft 210 and enclosing it. Instead of the common windings made of wire, the stator 206 comprises a number of conductor bars 232 inserted in grooves of iron packets 233 of the stator 232 and connected via connecting elements of a first circuit board 234 and a second circuit board 236.

The first end of the conductor bar 232 is connected to the first circuit board 234 and the second end of the conductor bar 232 on the opposite side of the first end is connected to the second circuit board 236. On the circuit boards 234, 236, electronic components 238 are arranged as connecting elements, switched between the conductor bars 232 and connecting them.

Furthermore, FIG. 6 shows an embodiment of the control unit 240 controlling operation of the electric machine 202.

During operation of the electrical machine 202, electrical current is conducted through the conductor bars 232 of the stator 206, generating a magnetic field. The magnetic field interacts with the permanent magnets 230 setting the rotor 208 in rotation.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for controlling an operation of a multi-phase electric machine with a stator and a rotor, wherein the stator or the rotor comprises permanent magnets, wherein the rotor or the stator comprises a plurality of conductor bars interconnected by connecting elements of at least one circuit board and disposed within a magnetic field of the permanent magnets and having an internal inductance connected, wherein the connecting elements are arranged outside the magnetic field and have an external inductance, wherein each phase includes at least one of the conductor bars, wherein the electric machine is controlled by regulating for each phase of the multi-phase electric machine at least one electrical quantity, which is dependent on the internal and external inductance of a respective phase, to a desired value determined in dependence on at least one mechanical operating parameter of the electric machine to provide the desired value of the at least one electrical quantity for each phase, wherein the at least one electrical quantity is a voltage, wherein an actual value of the at least one electrical quantity of the respective phase is tapped between the conductor bars and the connecting elements of the respective phase.

2. The method of claim 1, wherein the at least one electrical quantity is a current.

3. The method of claim 1, further comprising adjusting the desired value of the at least one electrical quantity with an algorithm configured for forward-looking control of the electric machine in dependency of at least one mechanical operating parameter of the electric machine.

4. The method of claim 3, wherein the at least one mechanical operating parameter comprises at least one parameter selected from a rotational speed of the electric machine and an angular position of the rotor relative to the stator.

5. The method of claim 1, wherein the electric machine is an electric motor or a generator.

6. A control system for controlling an operation of a multi-phase electric machine, the electric machine comprising a stator and a rotor, wherein the stator or the rotor comprises permanent magnets, wherein the rotor or the stator comprises a plurality of conductor bars interconnected by connecting elements of at least one circuit board and disposed within a magnetic field of the permanent magnets and having an internal inductance connected, wherein the connecting elements are arranged outside the magnetic field and have an external inductance, wherein each phase includes at least one of the conductor bars, wherein the control system is configured to regulate for each phase of the multi-phase electric machine at least one electrical quantity of the internal and external inductance of the respective phase to a desired value determined in dependence on at least one mechanical operating parameter of the electric machine to provide the desired value of the at least one electrical quantity for each phase, wherein the at least one electrical quantity is a voltage, wherein an actual value of the at least one electrical quantity of the respective phase is tapped between the conductor bars and the connecting elements of the respective phase.

7. The control system of claim 6, comprising a switching regulator for each phase.

8. The control system of claim 7, further comprising a control unit connected upstream of the switching regulators and configured to execute an algorithm to be used for feedforward control of the electric machine and to provide the desired value of the at least one electrical quantity for the respective phase.

9. The control system of claim 6, further comprising at least one measuring module for each phase, wherein the at least one measuring module is configured to measure an actual value of the at least one electrical quantity of the respective phase.

10. The control system of claim 6, further comprising an inverter connected between contacts to an external voltage source of the electric machine and the phases of the electric machine and configured to perform a switching control for the electric machine.

11. The control system of claim 10, further comprising an intermediate circuit capacitor which is arranged between two of the contacts.

12. The control system of claim 6, wherein the control system is disposed inside a housing of the electric machine.

13. A multi-phase electric machine, comprising a stator and a rotor, wherein the stator or the rotor comprises permanent magnets, wherein the rotor or the stator comprises a plurality of conductor bars interconnected by connecting elements of at least one circuit board and disposed within a magnetic field of the permanent magnets and having an internal inductance connected, wherein the connecting elements are arranged outside the magnetic field and have an external inductance, wherein each phase includes at least one of the conductor bars, wherein an operation of the electric machine is controlled by regulating for each phase of the multi-phase electric machine at least one electrical quantity of the internal and external inductance of the respective phase to a desired value determined in dependence on at least one mechanical operating parameter of the electric machine to provide the desired value of the at least one electrical quantity for each phase, wherein the at least one electrical quantity is a voltage, wherein an actual value of the at least one electrical quantity of the respective phase is tapped between the conductor bars and the connecting elements of the respective phase.

14. The electric machine of claim 13, wherein the conductor bars are disposed in a soft magnetic material.

15. The method of claim 13, wherein the at least one electrical quantity is a current.

16. The electric machine of claim 13, wherein the desired value of the at least one electrical quantity is adjusted with an algorithm configured for forward-looking control of the electric machine in dependency of at least one mechanical operating parameter of the electric machine.

17. The electric machine of claim 16, wherein the at least one mechanical operating parameter comprises at least one parameter selected from a rotational speed of the electric machine and an angular position of the rotor relative to the stator.

18. The electric machine of claim 13, wherein the electric machine is an electric motor or a generator.

* * * * *